Sept. 24, 1968   G. W. BROWN ETAL   3,402,424
CLOSED CHANNEL DEFEATHERING APPARATUS
Filed June 16, 1966   2 Sheets-Sheet 1

INVENTORS
GEORGE W. BROWN
CHARLES V. CORN

BY Newton, Hopkins,
Jones & Ormsby

ATTORNEYS

Sept. 24, 1968  G. W. BROWN ETAL  3,402,424
CLOSED CHANNEL DEFEATHERING APPARATUS
Filed June 16, 1966  2 Sheets-Sheet 2

INVENTORS
GEORGE W. BROWN
CHARLES V. CORN
BY Newton, Hopkins,
Jones & Ormsby

ATTORNEYS

United States Patent Office 3,402,424
Patented Sept. 24, 1968

3,402,424
CLOSED CHANNEL DEFEATHERING APPARATUS
George W. Brown, Chamblee, and Charles V. Corn, Gainesville, Ga., assignors to Gainesville Machine Company, Inc., Gainesville, Ga., a corporation of Georgia
Filed June 16, 1966, Ser. No. 557,981
4 Claims. (Cl. 17—11.1)

ABSTRACT OF THE DISCLOSURE

A poultry defeathering machine comprising a pair of rows of picking discs extending along each side of the path through which the fowl is conveyed, with one row of each pair of rows positioned generally above the path and the other row of each pair of rows positioned generally below the path. The discs are rotatable about axes extending generally through the center portion of the path, and elastic picking fingers extend from each disc toward the center portion of the path.

---

It has become common practice to utilize a plurality of moving rubber fingers to remove the feathers from chicken and other types of fowl. The rubber fingers are moved in a path so that they strike or rub against the chicken and scrape the feathers from its body. The chickens are usually conveyed along a path by a mechanical conveyor so that they come into the vicinity of the plurality of moving rubber fingers and pass by the fingers so that several areas of the body of the chicken are treated by the rubber fingers. While several arrangements of rubber fingers have been utilized, the most common arrangement is to mount the fingers on a rotating drum so that the fingers extend radially of the drum, or mount the fingers on the face of a disc and rotate the disc about its axis. While both of these arrangements have been successful to some extent, some difficulty has been encountered in keeping the fowl in its predetermined path so that it is thoroughly treated by the moving fingers. In several arrangements, the resilient rubber fingers tend to bounce the fowl around during its travel on the conveyor line so that the full effect of the fingers is not felt by the fowl. Furthermore, the movement of the fowl as it is struck by the rubber fingers is not necessarily only a movement in the horizontal direction, but is frequently a vertical movement such that the fowl actually moves up out of the reach of the moving rubber fingers.

Accordingly, this invention involves disposing a plurality of sets of rotating rubber fingers so that they form a channel closed at its bottom, top and sides through which a fowl can be conveyed, whereby any movement of the fowl, other than its movement through the channel, will cause the fowl to encounter rubber picking fingers, so that the fowl is treated by rubber picking fingers regardless of its movement through the channel.

Thus, it is an object of this invention to provide a method of picking fowl conveyed along a predetermined path, whereby the fowl is picked without regard to its position along said predetermined path.

Another object of this invention is to provide a method of picking fowl being conveyed along a predetermined path whereby the picking function tends to confine the fowl to its predetermined path.

Another object of this invention is to provide apparatus for picking fowl wherein the picking elements of the apparatus tend to confine the fowl in a predetermined path of travel.

Another object of this invention is to provide apparatus for picking fowl being conveyed along a predetermined path whereby the force exerted on the fowl by the picking elements of the apparatus will not cause the fowl to be removed from its travel along the predetermined path.

Another object of this invention is to provide apparatus for picking fowl, whereby the fowl is conveyed along the predetermined path and is picked at several angles disposed about said predetermined path.

Another object of this invention is to provide a method and apparatus for picking fowl that is economical in operation, expedient in use, thoroughly picks the fowl, and is well designed to meet the economics of manufacture.

Other objects, features and advantages of the present invention will become apparent upon reading the following disclosure, taken in conjunction with the accompanying drawings, in which.

Figure 3:
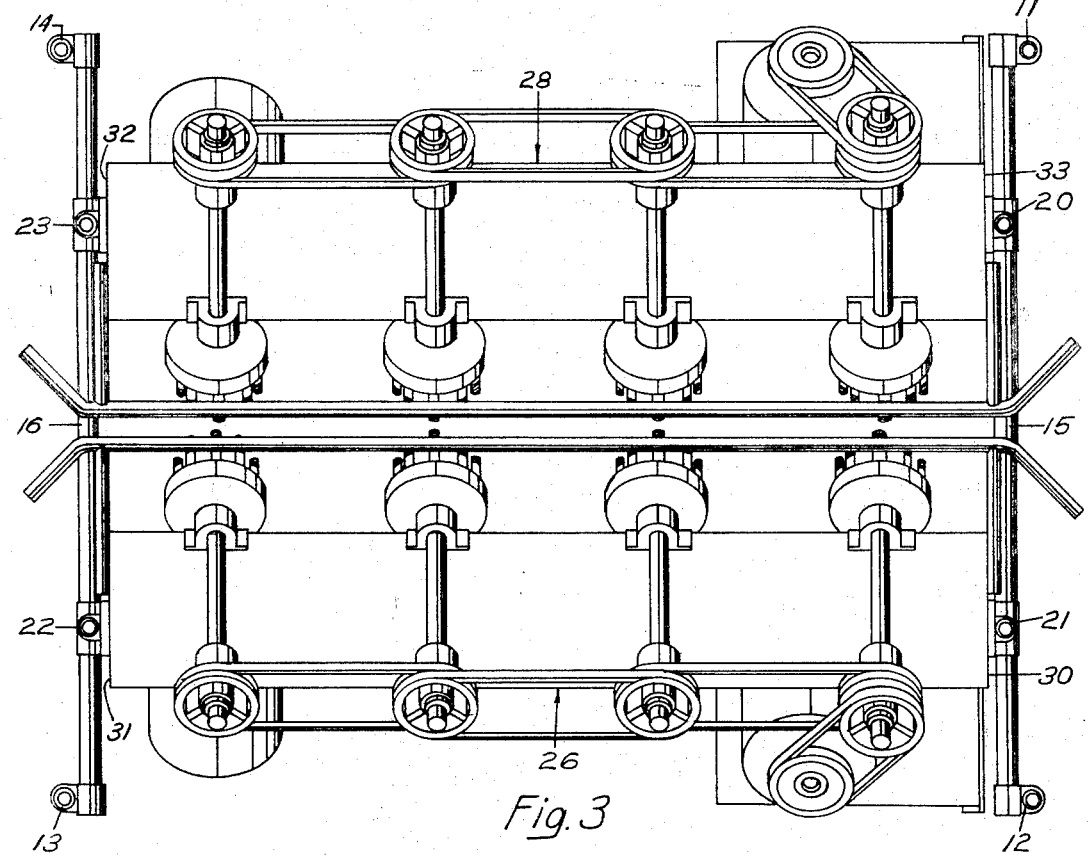
FIG. 3 is a plan view of the picking machine.

Referring now more particularly to the drawing, in which like numerals indicate like parts throughout the several views, the picking machine 10 is supported from the floor of the building by the stanchions 11, 12, 13 and 14 (FIG. 3). The horizontal supports 15 and 16 extend between the stanchions 11–14, respectively, and are attached thereto at their ends by T connections 18. The horizontal supports 15 and 16 support vertically extending supports 20, 21 and 22, 23, respectively, which are slidably connected to the horizontal supports 15 and 16 by means of the T connections 25. The T connections 18 and 25 are of conventional construction, and are of the type that can be slid along the stanchions 11–14 or supports 20–23, respectively, and tightened so as to clamp down on their respective stanchions or supports and remain in place. Accordingly, the horizontal supports 15 and 16 can be adjusted in elevation by loosening their respective T connections 18 and sliding them along their respective stanchions to a new position, and retightening the T connections; while the vertically extending supports 20–23 can be adjusted to vary their position along the length of the horizontal supports 15 and 16 by manipulation of the T connections 25 in a similar manner.

The picking machine comprises a pair of frame members 26 and 28 positioned in back to back relationship, having inner walls 27 and 29 facing each other. The frame members 26 and 28 further comprise end walls 30, 31 and 32, 33, respectively, sloped upper walls 34 and 35, respectively, sloping downwardly toward the inner walls 29 and 30, and sloped lower walls 37 and 38, respectively, sloping upwardly toward the inner walls 29 and 30. The frame members 26 and 28 are open at their exterior sides to form a space for mounting and supporting other elements of the picking machine.

Figure 1:
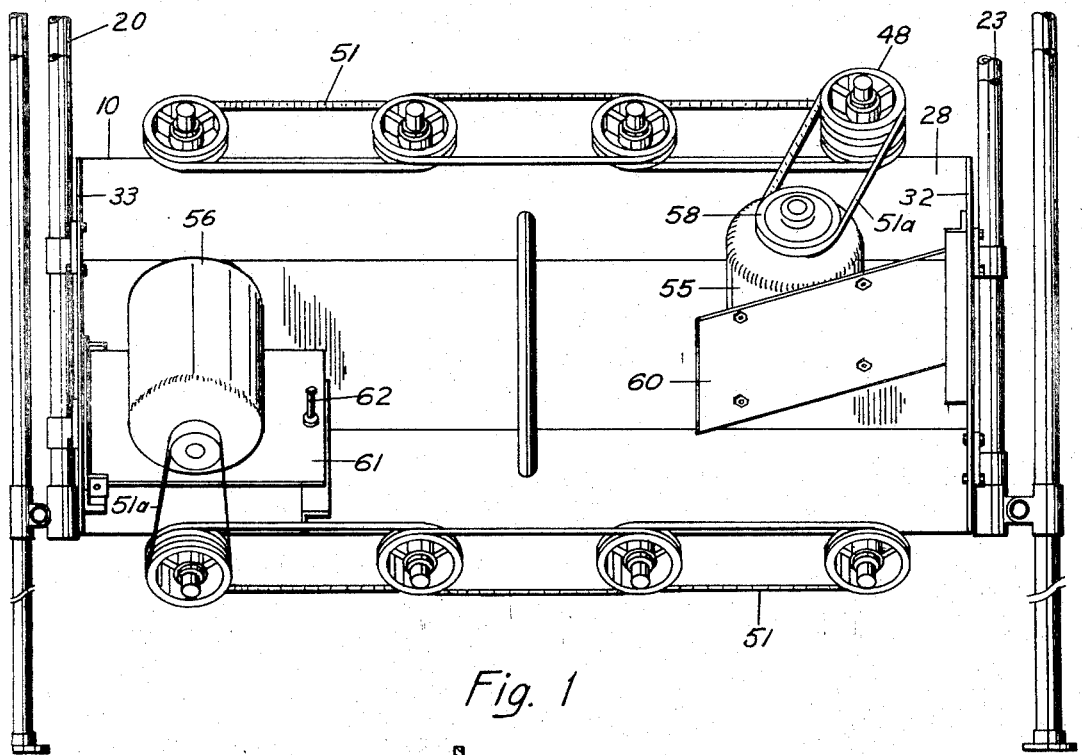
FIG. 1 is a side elevational view of the picking machine of the present invention.

The end walls 30–33 have attached thereto brackets 40, each having a sleeve 41 of a size sufficient to receive the vertically extending supports 20–23. The pair of brackets 40 connected to each of the end walls are spaced apart and their sleeve elements 41 aligned with each other so that the vertical extending supports 20–23 can be received therein, and the vertically extending supports will support the frame members 26 and 28 in the position shown in FIGS. 1–3.

Figure 2:
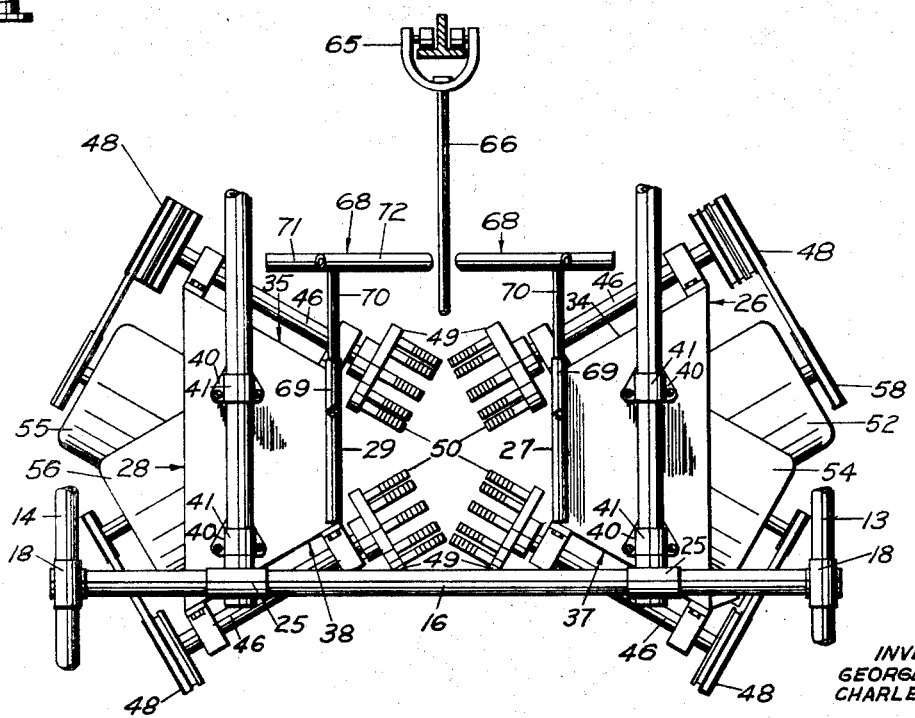
FIG. 2 is an end elevational view of the picking machine.

The sloped upper and lower walls 34, 35 and 37, 38, respectively, each have a plurality of pairs of aligned bearings 45 connected thereto. Each pair of bearings 45 receives a shaft 46 therein having its axis disposed substantially parallel to the surface of its respective sloped wall. As shown in FIG. 2, each shaft 46 slopes toward the central portion of the path of travel of the fowl and terminates in a pair of sheaves 48 at one end and in a picking disc 49 at the other end. The picking discs 49 each have a plurality of rubber picking fingers 50 disposed thereabout which extend further toward the path of travel of the fowl, for picking the fowl passing through the picking machine 10. As is shown in FIG. 2, a row of discs 49 is positioned in each quadrant of the path through which the fowl travels as defined by a vertical and a lateral plane intersecting at the center of the path. Fingers 50 extend further toward the center portion of the path and define a generally diamond shaped channel through the machine.

Each pair of sheaves 48 of each picking disc 49 is connected to an adjacent pair of sheaves by means of drive belts 51. Electric motors 52 and 54 are connected to frame member 26 and electric motors 55 and 56 connected to frame member 28. The electric motor 52 has a sheave 58 rotatably connected thereto that is also connected to the endmost pair of sheaves 48 of the sheaves mounted on the sloped upper wall 34, so that rotation of the sheave 58 of the motor 52 causes all of the pairs of sheaves 48 of the sloped upper wall 34 to rotate and to rotate their picking discs 49. Electric motors 54, 55 and 56 are connected in a similar manner to the sheaves 48 of the picking discs of the remaining sloped upper and lower walls so as to rotate the picking discs 49.

It should be noted that the arrangement of the pairs of sheaves 48 or each of the sloped walls 34, 35, 37, and 38, together with the belts 51 is such that the picking discs mounted from a single wall will all rotate in the same direction; that is, the picking discs 49 mounted from the sloped upper wall 34 will all rotate in the same direction. Furthermore, if the motors 52, 54, 55, and 56 are all constructed so that they rotate in the same direction, the picking discs 49 will rotate in the same direction; that is, the picking discs 49 supported from the sloped upper walls 34 and 35 will rotate so that the upper portion of the discs all rotate so that they appear to be going out of the drawing (FIG. 2), while the lower portion of all of the discs will appear to be coming into the drawing. Also, the picking discs 49 supported by the sloped lower walls 37 and 38 will rotate in a similar manner; that is, the upper portion of the discs 49 will appear to be moving into the drawing while the lower portions thereof will appear to be moving out of the drawing.

The motors 52 and 55 which motivate the picking discs supported from the upper sloped walls of the frame members are supported from the end walls 30 and 32 by means of motor support plates 60 which are suspended from the end walls. The motor support plates 60 are disposed so as to support the motors 52 and 55 so that the axes of their sheaves are disposed in a plane substantially parallel to the axes of the sheaves 48 which they operate, so that the driving belt 51a that extends between the motor sheave and the sheaves of the picking discs 49 will function properly. The motor support plate 60 is supported from the end walls 30 and 32 on a cantilever basis so that the weight of the motor mounted thereon tends to depress the motor support plate to a certain extent. Of course, this tends to stretch the belt 51a tight so that it is always in firm connection between the sheaves of the motor and picking discs.

The motors 54 and 56 are supported on motor support plates 61 that are also connected at one end to the end walls 31 and 33, respectively. Since the motor support plates 61 tend to move under the weight of their respective motors toward the sheaves which they drive, a tension mechanism 62 is constructed to urge their support plates away from the sheaves 48 to exert a tension on the drive belt 51a.

The picking machine 10 is positioned below an overhead conveyor 65 of conventional design. The conveyor 65 has hanging elements 66 suspending downwardly therefrom at prearranged intervals.

The frame members 26 and 28 each have guide frames 68 supported from end walls 30–33. The guide frames 68 are connected to the end walls by means of sockets 69 rigidly attached to the end walls. The guide frames 68 each comprise upwardly extending supports 70 at each end slidably received in the sockets 69, horizontal supports 71 extending horizontally toward the opposite frame member from the vertical support 70, and guide bars 72 extending longitudinally of the picking machine between the horizontal support 71. With this arrangement, it can be seen that the hanging element 66 of the conveyor 65 will be guided by the guide bars 72 of the guide frames 68 down the length of the picking machine 10.

*Operation*

Figure 4:
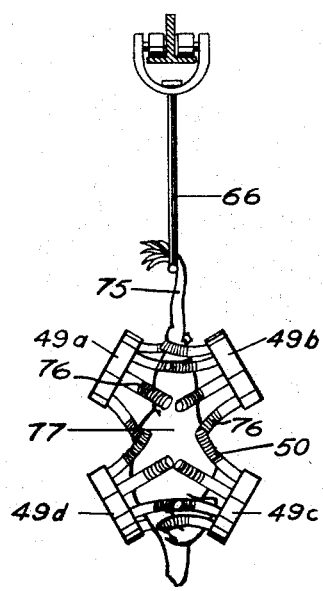
FIG. 4 is a schematic representation of the method in which the picking fingers of the machine contact the fowl as it is conveyed through the machine.

When the picking machine 10 is operated, a plurality of chickens 75 (FIG. 4) are suspended from the hanging elements 66 of the conveyor 65 by their feet, so that the body of the chickens hang downwardly from the conveyor in the picking path of the apparatus. The picking machine 10 is then adjusted in height by loosening the T connections 18 on the stanchions 11–14, positioning the picking machine so that the chicken 75 is received between the picking discs 49, and retightened. Also, the frame members 26 and 28 are adjusted in distance from each other by adjusting the T connections 25 in a similar manner. The motors 52, 54, 55 and 56 are then energized to rotate picking discs 49 so that their fingers 50 are rapidly rotated. As the fingers 50 rapidly rotate, they tend to flare out to a certain extent, as shown in FIG. 4, so that the fingers 50 positioned about the periphery of each of the picking discs 49 tend to form a picking cup 76. Furthermore, the fingers 50 of the picking discs 49 of a set of picking discs positioned in a single vertical plane extended toward a central area and tend to form a pocket 77 that is completely closed on four sides, or substantially so, and a plurality of sets of picking discs arranged as shown in the drawings tend to form a picking path or channel. When the conveyor 65 is operated it moves the chickens 75 so that they pass through the channel formed by the fingers 50 of the picking discs 49.

The fact that the picking fingers 50 of each picking disc 49 tend to flare out upon rotation of the discs causes the picking fingers located near the periphery of each picking disc to form a cup therewith so that the cups formed by all of the picking discs of each set of picking discs creates a pocket to accommodate the body of the chicken. The pocket formation is generally closed at its top, bottom and sides by the rotating fingers with only the front and back being left slightly open to allow the fowl to pass therethrough. Each pocket tends to engulf the chicken so that the picking fingers are effective on all sides of the chicken. Thus, the picking fingers 50 are effective to remove feathers from the chicken substantially over the entire body of the chicken.

When the chickens 75 are conveyed by the conveyor 65 through the picking channel formed by the sets of picking discs 49, the chicken 75 is engaged from substantially all sides by the picking fingers 50. As is best shown in FIG. 4, when the picking fingers 50 of the picking discs 49 exert a force on the chicken 75 upon rotation of the discs, it merely moves the chicken 75 toward the opposite disc 49b. Of course, the force of the fingers 50 of the disc 49b imparted to the chicken prevents it from bouncing away from the fingers of the disc 49a so that the chicken is retained between these discs. Of course, the same function is performed by the discs 49c and 49d so that the chicken remains therebetween. The fact that the chicken is not allowed to bounce away from the picking fingers acting thereon causes the chicken to feel the full effect of the picking fingers. Of course, this accomplishes a more effective picking action from the picking fingers.

The picking fingers of the opposite discs 49a and 49b and 49c and 49d tend to force the chicken into the fingers of the opposite disc further than the chicken would normally be forced into the fingers by its own weight. Thus, a longer length of each picking finger 50 contacts the surface of the chicken and is effective to remove feathers from the chicken.

The guide bars 72 of the guide frames 68 of each frame member of the picking machine are effective to guide the hanging elements 66 of the conveyor 65 directly along the picking channel formed by the picking discs of the machine. This construction further tends to maintain chickens in the channel formed by the sets of picking discs so that any unusual bouncing or vibration of the chicken in the channel will not function to cause the chicken to bounce upwardly out of the channel.

Since the horizontal supports 15 and 16 are independently mounted on their respective stanchions, one horizontal support can be elevated to a different height than the other horizontal support so as to tilt the picking machine 10. Of course, when the chickens are conveyed through a tilted machine the picking fingers located at the higher end of the machine will tend to more thoroughly remove the feathers on the shank of the chicken and lower body of the chicken while the picking fingers at the lower end of the machine will be more effective to remove the feathers from the breast, neck and wings of the chicken. Of course, if the picking machine is utilized to remove feathers from larger turkeys, or smaller fowl, the vertically extending supports 30–23 can be adjusted to move the frame members 26 and 28 toward or away from each other to accommodate fowl of different sizes. Also, the vertically extending supports at one end of the picking machine can be positioned closer to each other than those at the opposite end of the machine so that the picking fingers of opposite picking discs will be closer to each other at one end of the machine than at the opposite end. Of course, this arrangement is effective to cause the picking fingers 50 to exert more force on the fowl at the narrow end of the machine than at the wide end of the machine. Inasmuch as the opposite discs force the fowl toward each other so that the fowl cannot escape the picking fingers, and further so that the fowl is received to a greater depth in the picking fingers, a substantial latitude is attained in adjusting the horizontal supports closer to each other at one end of the machine than at the other end than in any previously known arrangement.

It will be obvious to those skilled in the art that many variations may be made in the embodiments chosen for the purpose of illustrating the present invention without departing from the scope thereof as defined by the appended claims.

What is claimed as our invention is:

1. A poultry defeathering machine through which fowl are conveyed along a predetermined path, a pair of rows of support members extending along each side of the path, with one row of each pair of rows positioned generally above the path and the other row of each pair of rows positioned generally below the path, each of said support members being rotatable about axes extending toward the path, and a plurality of elastic picking fingers supported by each of said support members and sloping from side-to-side toward the geometrical center portion of the path.

2. The invention of claim 1 wherein said picking fingers define a picking path which is generally diamond-shaped in transverse cross-section.

3. A poultry defeathering machine through which fowl are conveyed a predetermined path, a row of picking discs in each quadrant of the path, a plurality of flexible picking fingers mounted on each of said discs and converging generally toward the center of the path in such a manner that as a fowl travels along the path the picking fingers of said discs contact substantially the entire body portion of the fowl.

4. In a poultry defeathering machine defining a path through which fowl are conveyed, four rows of support members positioned parallel to and about the path, with the first row and the second row positioned on one side of a vertical plane extending through the centerline of the path and the third row and the fourth row positioned on the opposite side of the vertical plane, and with the first row and the third row positioned on one side of a lateral plane extending through the centerline of the path and the second row and the fourth row positioned on the opposite side of the lateral plane, each of said support members being rotatably supported so that its axis of rotation intersects the path, and flexible picking fingers extending from each support member and sloping generally toward the center portion of the path.

References Cited

UNITED STATES PATENTS

| | | | |
|---|---|---|---|
| 2,571,034 | 10/1951 | Harvey | 17—11.1 |
| 3,197,809 | 8/1965 | Corn et al. | 17—11.1 |
| 3,203,035 | 8/1965 | De Long | 17—11.1 |
| 3,218,668 | 11/1965 | Engkjer et al. | 17—45 |
| 3,235,904 | 2/1966 | Brown et al. | 17—11.1 |
| 3,273,198 | 9/1966 | Tomlinson | 17—11.1 |

LUCIE H. LAUDENSLAGER, *Primary Examiner.*